(12) United States Patent
Ooki et al.

(10) Patent No.: US 7,507,507 B2
(45) Date of Patent: Mar. 24, 2009

(54) LIQUID CRYSTAL DISPLAY DEVICE

(75) Inventors: Noboru Ooki, Ooamishirasato (JP); Ken Hashimoto, Mobara (JP); Miyuki Kunimatsu, Chiba (JP); Noriyuki Okabe, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 242 days.

(21) Appl. No.: 11/283,746

(22) Filed: Nov. 22, 2005

(65) Prior Publication Data

US 2006/0110548 A1    May 25, 2006

(30) Foreign Application Priority Data

Nov. 25, 2004    (JP)    ............................. 2004-340057

(51) Int. Cl.
C09K 19/00 (2006.01)
C09K 19/06 (2006.01)
C09K 19/52 (2006.01)

(52) U.S. Cl. ..................... 430/20; 428/1.1; 252/299.01; 349/176

(58) Field of Classification Search ................... 430/20; 428/1.1; 252/299.01; 349/176
See application file for complete search history.

(56) References Cited

U.S. PATENT DOCUMENTS 6,061,114 A * 5/2000 Callegari et al. ............. 349/125
2004/0234690 A1* 11/2004 Hiruma ....................... 427/256

* cited by examiner

*Primary Examiner*—Geraldina Visconti
(74) *Attorney, Agent, or Firm*—Reed Smith LLP; Stanley P. Fisher, Esq.; Juan Carlos A. Marquez, Esq.

(57) ABSTRACT

The invention provides a liquid crystal display device in which incorporation of an organic compound into liquid crystal due to a display defect can be reduced to a great extent. In the liquid crystal display device, a film containing a hydrocarbon represented by the formula $C_nH_{2n+2}$, in which n is from 5 to 30, is formed on a face, which comes in contact with the liquid crystal, of each of a pair of substrates which are arranged in a manner of facing each other via the liquid crystal.

9 Claims, 6 Drawing Sheets

SATURATED HYDROCARBON

| MOLECULAR FORMULA | MOLECULAR WEIGHT | NAME | FREEZING POINT(°C) | BOILING POINT(°C) | USAGE |
|---|---|---|---|---|---|
| CH4 | 16 | METHANE | −182.6 | −164 | FUEL GAS |
| C2H6 | 30 | ETHANE | −172 | −89 | " |
| C3H8 | 44 | PROPANE | −190 | −42 | LPG |
| C4H10 | 58 | BUTANE | −135 | −0.5 | " |
| C5H12 | 72 | PENTANE | −129 | 36 | SOLVENT |
| C6H14 | 86 | HEXANE | −94 | 69 | GASOLINE |
| C7H16 | 100 | HEPTAN | −90 | 98 | " |
| C8H18 | 114 | OCTANE | −59 | 126 | " |
| C9H20 | 128 | NONAN | −54 | 151 | " |
| C10H22 | 142 | DECCAN | −30 | 174 | " |
| C11H24 | 156 | UNDECAN | −26 | 196 | KEROSENE |
| C12H26 | 170 | DODECAN | −10 | 216 | " |
| C13H28 | 184 | TORIDECCAN | −6 | 230 | " |
| C14H30 | 198 | TETRADECCAN | 5.5 | 251 | " |
| C15H32 | 212 | PENTADECAN | 10 | 268 | LIGHT OIL |
| C16H34 | 226 | HEXDECAN | 18 | 280 | " |
| C17H36 | 240 | HEPTADECAN | 22 | 303 | LIGHT OIL, CRUDE PETROLEUM e.t.c. |
| C18H38 | 254 | OCTADECAN | 28 | 317 | CRUDE PETROLEUM |
| C19H40 | 268 | NONADECAN | 32 | 330 | " |
| C20H42 | 282 | EICOSAN | 36 | | LUBRICANT, VASELINE, CANDLE e.t.c. |
| C25H52 | 352 | PENTACOSAN | 53 | | " |
| C30H62 | 422 | TRICOSAN | 66 | | " |
| C40H82 | 562 | TETRACOSAN | 81 | | VASELINE, CANDLE e.t.c. |

| MATERIAL NAME | ONE SIDE MEAN VALUE (ng/10cm × 10cm) | STANDARD DEVIATION |
|---|---|---|
| DODECAN (C12H26) | 3.6 | 2.1 |
| TORIDECCAN (C13H28) | 0.2 | 0.1 |
| TETRADECCAN (C14H30) | 0.5 | 0.2 |

LIQUID CRYSTAL DISPLAY DEVICE

CROSS-REFERENCE TO RELATED APPLICATION

The disclosure of Japanese Patent Application No. 2004-340057 filed on Nov. 25, 2004 including the specification, drawings and abstract is incorporated herein by reference in its entirety.

BACKGROUND OF THE INVENTION

The present invention relates to a liquid crystal display device.

The liquid crystal display device is constituted by allowing substrates provided in such a manner as facing each other via liquid crystal to be outer casings and containing a multiple of pixels in a spreading direction of the liquid crystal.

A pair of electrodes are provided to each pixel and, liquid crystal molecules are allowed to behave in accordance with an electric field generated between the electrodes.

On this occasion, an initial orientation direction of each of the liquid crystal molecules is regulated by an orientation film formed on a face of each substrate at the side of the liquid crystal such that it comes in contact with the liquid crystal and, then, such behavior of the liquid crystal in accordance with strength, large or small, of the electric field is allowed to be visualized as an amount of light transmitted through a polarizing plate formed on a face of each substrate at a side opposite to the liquid crystal.

BRIEF SUMMARY OF THE INVENTION

However, in the liquid crystal display device having such constitution as described above, it is detected that a multiple of organic compounds of several types are incorporated in the liquid crystal and, then, it is confirmed that these organic compounds have caused a display defect.

In the production of the liquid crystal display device, for example, after an orientation film is formed, it is ordinarily performed to remove such organic compound as attached to the orientation film by cleaning or a heating treatment and, therefore, it has not been considered that the organic compound attached to the orientation film in the liquid crystal causes the display defect.

However, it is found that, during a period of from after the step of removing the organic compound to before the next step, an organic compound in the atmosphere is adsorbed on a surface of the orientation film. Then, it is ascertained that the display defect differs according to the liquid crystal display devices and corresponds to length of time in which the liquid crystal display device is left to stand after the step of removing the organic compound.

A mechanism of adsorbing the organic compound in the atmosphere by the substrate has been studied and, as a result, it is found that the organic compound can be divided in to a high boiling point organic compound and a low boiling point organic compound and, then, adsorption of the low boiling point organic compound can be carried out by being left to stand merely for a short period of time and adsorption and desorption are repeated between a non-adsorptive material such as the substrate, while adsorption of the high boiling point organic compound is performed by being left to stand for a long period of time and, once the high boiling point organic compound is adsorbed, it is hardly desorbed.

This means that, in a case in which the high boiling point organic compound which is hardly desorbed covers an adsorption site on a surface of the substrate, the organic compound existing in the atmosphere (low boiling point organic compound or the like) can be prevented from being adsorbed.

Further, it has been confirmed that, the high boiling point organic compound has a property similar to that of a liquid crystal compound (constituted from a hydrocarbon, an aromatic ring or the like) and, even when any one of such organic compounds is incorporated in the liquid crystal, it gives a little influence on the display defect.

Under these circumstances, the present invention has been achieved and has an object of providing a liquid crystal display device which has reduced incorporation of an organic compound which causes a display defect into the liquid crystal to a great extent.

Among inventions disclosed in the present invention, excerpts of representative ones are described in short below.

(1) A liquid crystal display device according to the invention is characterized in that a film containing a hydrocarbon represented by $C_nH_{2n+2}$ is formed, for example, on a face, which comes in contact with liquid crystal, of each substrate of a pair of substrates arranged in a manner of facing each other via the liquid crystal, in which n is a value of from 5 to 30.

(2) A liquid crystal display device according to the invention is characterized in that a film containing a hydrocarbon represented by $C_nH_{2n+2}$ is formed, for example, on a face, which comes in contact with liquid crystal, of each substrate of a pair of substrates arranged in a manner of facing each other via the liquid crystal, in which n is a value of from 10 to 30.

(3) A liquid crystal display device according to the invention is characterized in that a film containing a hydrocarbon represented by $C_nH_{2n+2}$ is formed, for example, on a face, which comes in contact with liquid crystal, of each substrate of a pair of substrates arranged in a manner of facing each other via the liquid crystal, in which n is a value 25.

(4) A liquid crystal display device according to the invention is, for example, under a premise of the constitution of anyone of (1) to (3), characterized in that the film containing the hydrocarbon represented by the formula $C_nH_{2n+2}$ is formed on an upper face of an orientation film.

(5) A liquid crystal display device according to the invention is, for example, under a premise of the constitution of anyone of (1) to (3), characterized in that the film containing the hydrocarbon represented by the formula $C_nH_{2n+2}$ simultaneously serves as an orientation film.

(6) A liquid crystal display device according to the invention is, for example, under a premise of the constitution of any one of (1) to (5), characterized in that the film contains the hydrocarbon represented by the formula $C_nH_{2n+2}$ in an amount of 0.2 ng/cm$^2$ or more.

Since the liquid crystal display device having such constitution as described above is attached with a high boiling point organic compound on a face of the substrate at the side of the liquid crystal in a manner of coming in contact with the liquid crystal, after attachment of the high boiling point organic compound in a process of production of the device, adsorption of the low boiling point organic compound existing in the atmosphere by the high boiling point organic compound can be prevented. This is because a state in which the adsorption site is filled with the existence of the high boiling point organic compound is generated.

It has been described above that the high boiling point organic compound has a property similar to that of the liquid crystal and, even when the high boiling point organic compound is incorporated in the liquid crystal, a little influence is given to the display defect.

Therefore, the incorporation of the organic compound into the liquid crystal which causes the display defect can be reduced to a great extent.

DETAILED DESCRIPTION OF THE INVENTION

Hereinafter, the liquid crystal display device according to the present invention is now described in detail with reference to the preferred embodiments shown in the accompanying drawings.

Figure 1:
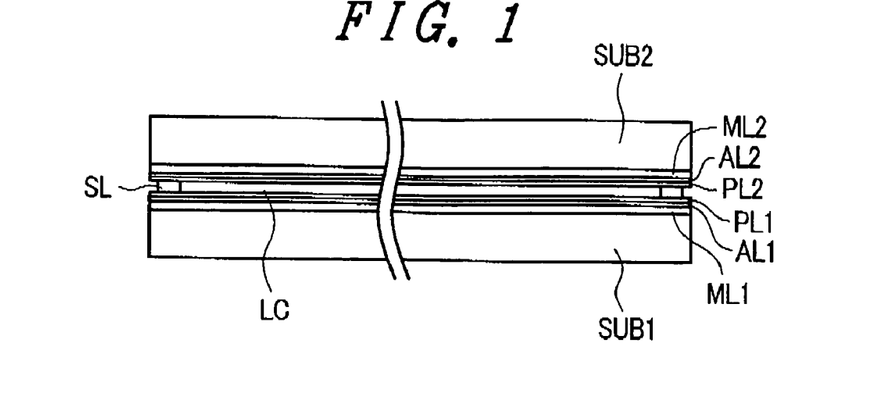
FIG. 1 is a cross-sectional diagram showing an embodiment of a liquid crystal display device according to the present invention.

FIG. 1 is a cross-sectional diagram showing an embodiment of a liquid crystal display device according to the present invention.

In FIG. 1, there are substrates SUB1 and SUB2 facing each other via liquid crystal LC, and an orientation film AL1 is formed on a face, at the side of the liquid crystal, of the substrate SUB1 via a laminate material layer ML1 and, then, a high boiling point organic material layer PL1 is attached to an upper face of the orientation film AL1. Further, an orientation film AL2 is formed on a face, at the side of the liquid crystal, of the substrate SUB2 via a laminate material layer ML2. A high boiling point organic material layer PL2 is attached to an upper face of the orientation film AL2.

The laminate material layers ML1, ML2 are constituted by containing a pair of electrodes per pixel for applying an electric field to the liquid crystal LC, various types of signal wires for supplying voltage to these electrodes and the like and, further, depending on the type of the liquid crystal display device, a thin film transistor or the like which functions as a switching device is formed.

Still further, the orientation films AL1, AL2 regulate an initial orientation direction of the liquid crystal LC which comes in contact therewith and they are necessitated for various types of liquid crystal display devices.

The high boiling point organic material layers PL1, PL2 are provided on upper faces of the orientation films AL1, AL2, respectively, without impairing functions of the orientation films AL1, AL2 to the liquid crystal and, for example, are constituted by a material such as $C_{12}H_{26}$ (n-Dodecane), $C_{13}H_{28}$ (n-Tridecane) or $C_{14}H_{30}$ (n-Tetradecane).

The high boiling point organic material layers PL1, PL2 constituted by these materials are hardly removed even though they are made of the organic materials; therefore, an incorporation of a large amount thereof into the liquid crystal LC can be avoided. Further, even when any one of the materials of the high boiling point organic material layers PL1, PL2 is incorporated into the liquid crystal, since the high boiling point organic material is similar to that of the liquid crystal compound, the display device can be constituted such that the incorporation seldom gives influence to the display defect.

Further, in FIG. 1, a reference mark SL denotes a seal material and not only seals the liquid crystal LC interposed between the respective substrates SUB1 and SUB2 but also realized fixing the substrate SUB 2 against the substrate SUB1.

In the liquid crystal display device constituted as described above, since the high boiling point organic material layer PL1 (PL2) which is hardly desorbed covers the adsorption site on the surface of the substrate SUB1 (SUB2) in the production process, s an effect in which the organic compound (low boiling point material layer or the like) existing in the atmosphere is not adsorbed can be realized. For this account, in a case in which the substrate SUB1 (SUB2) is left to stand until it is treated in the next step, even when time periods of such left-over differ from one another, any problem (display defect to be generated in accordance with left-over time periods) is not particularly generated.

Figure 2:
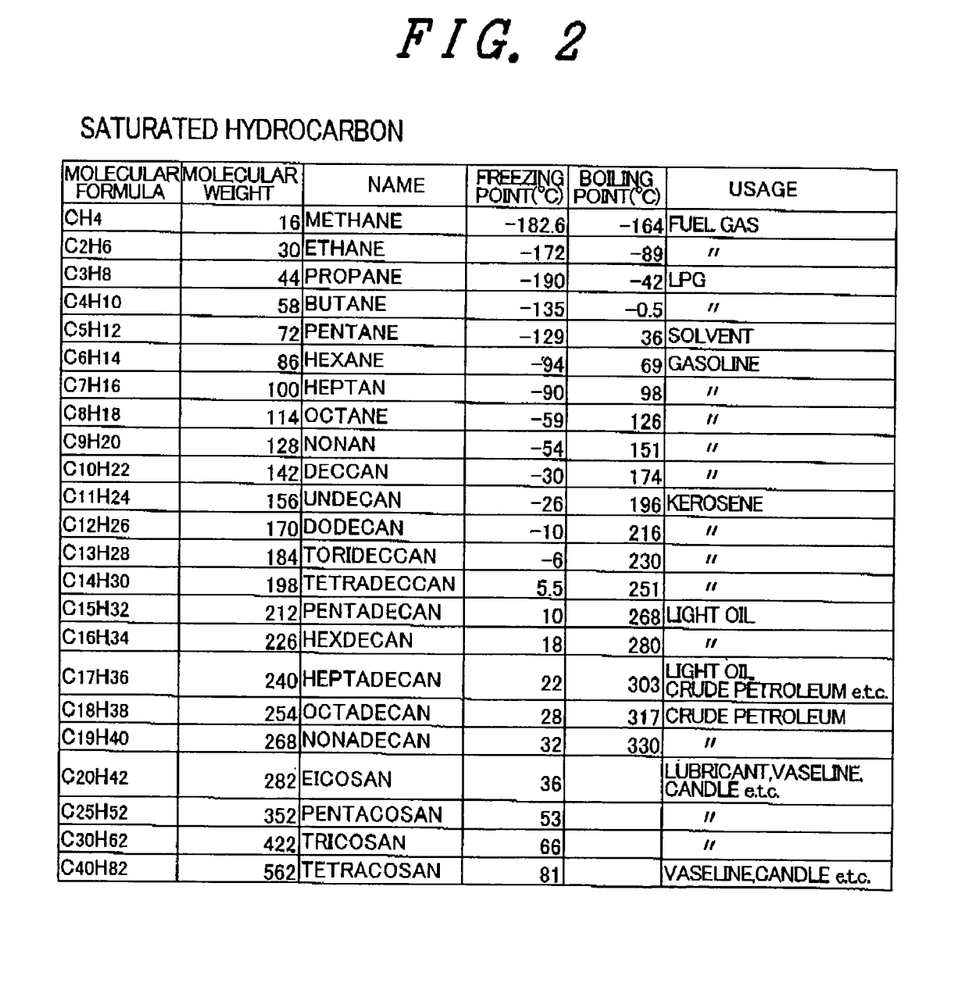
FIG. 2 describes molecular formulae, molecular weights, freezing points, boiling points and usages of saturated hydrocarbons and some of these saturated hydrocarbons are materials to be attached on a face, at the side of the liquid crystal, of the substrate of the liquid crystal display device according to the invention.

FIG. 2 shows examples of various saturated hydrocarbons represented by the molecular formula $C_nH_{2n+2}$ in a graph state and describes molecular formulae, molecular weights, name, freezing points (° C.), boiling points (° C.) and usages of $CH_4$, $C_2H_6$, $C_3H_8$, ..., $C_{30}H_{62}$ and $C_{40}H_{82}$.

Among these saturated hydrocarbons, those from $C_5H_{12}$ to $C_{30}H_{62}$ are substances in a liquid state or solid state. When $C_n$ is small among $C_nH_{2n+2}$, it has a tendency to be evaporated with time and, according to a test result, when the substrate is left to stand in the process of production, it is confirmed that it has been replaced with DOP (di-2-ethyl-hyexyl phthalate) as an organic compound floating in the atmosphere. A boiling point thereof approximately corresponds to that of $C_{25}$ and, therefore, $C_{25}$ becomes optimal. Further, compounds from about $C_{10}$ which is hardly evaporated to about $C_{30}$ are preferred and compounds in a usable range are from $C_5$ which is not gas to $C_{30}$.

Among these compounds, it was confirmed that those appropriate for use in the high boiling point organic material layer PL are in the range of from $C_5H_{12}$ to $C_{30}H_{62}$, namely, hydrocarbons represented by $C_nH_{2n+2}$, in which n is a value of from 5 to 30.

Further, it was also confirmed that those in the range of from $C_5H_{22}$ to $C_{30}H_{62}$ are more preferable, namely, hydrocarbons represented by $C_nH_{2n+2}$, in which n is a value of from 10 to 30.

Further, it was also confirmed that $C_{25}H_{52}$, namely, hydrocarbons represented by $C_nH_{2n+2}$, in which n is a value of 25, is most preferable.

Figure 3A:
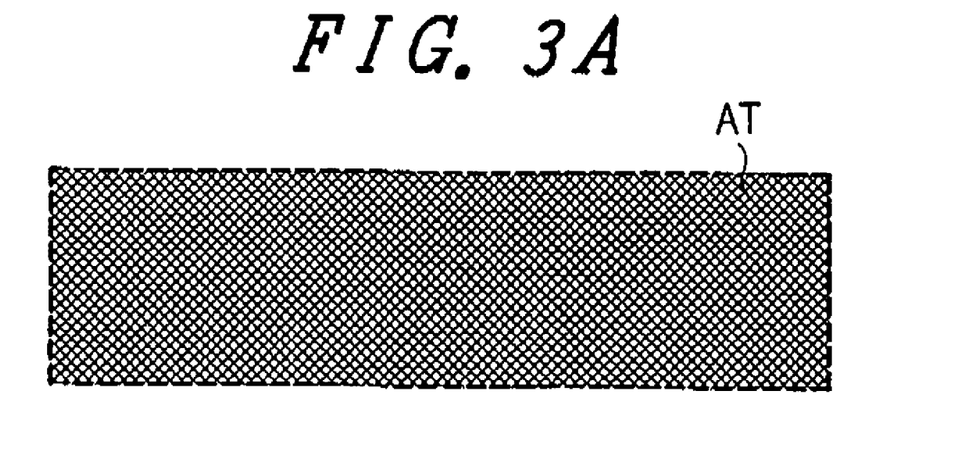
FIG. 3 is an explanatory diagram showing an embodiment of a method for attaching any one of the saturated hydrocarbons on the substrate.

FIG. 3 is a diagram showing an embodiment of a method for forming the high boiling point organic material layer PL.

Figure 3B:
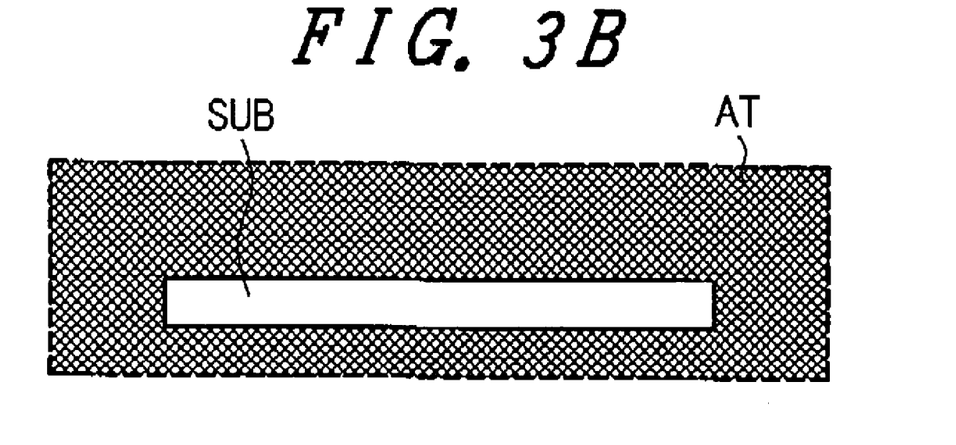
Figure 3C:
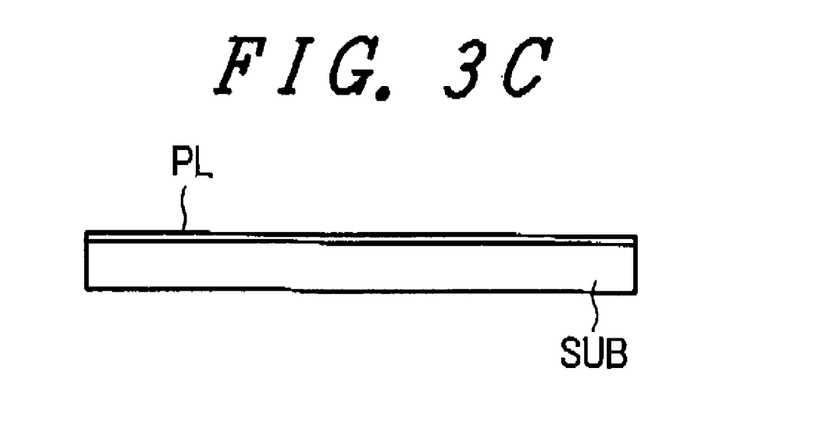

At least one substance among examples of substances represented by $C_nH_{2n+2}$ is vaporized to form an atmosphere AT (FIG. 3A) and, then, the substrate (an orientation film is formed on a surface) SUB is placed in the atmosphere AT and left to stand for given period of time therein to apply a film of the thus-vaporized substance on the surface of the substrate SUB (FIG. 3B). The substrate SUB taken out of the atmosphere AT is such substrate as being applied with a high boiling point material layer PL on the surface thereof (FIG. 3C).

FIG. 4 is a diagram showing another embodiment of a method for forming the high boiling point organic material layer PL.

Figure 4A:
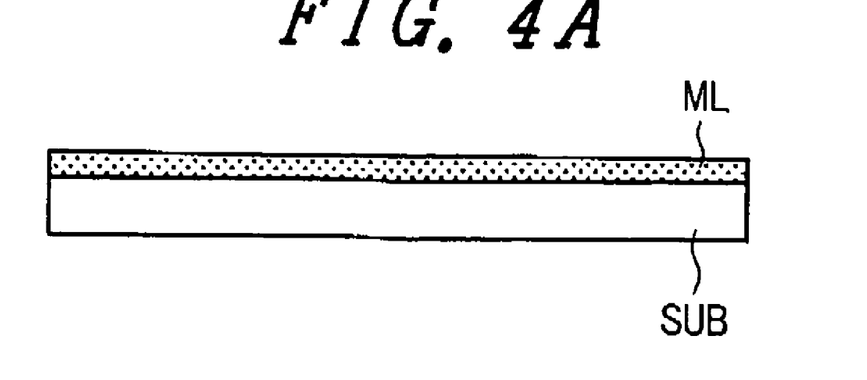
FIG. 4 is an explanatory diagram showing another embodiment of a method for attaching any one of the saturated hydrocarbons on the substrate.
Figure 4B:
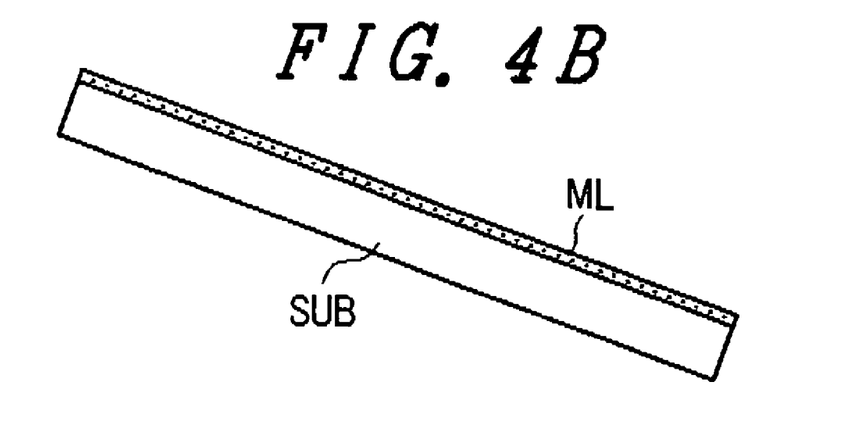

At least one substance among examples of the substances described above is mixed with the material of the orientation film and, then, the resultant mixed solution ML is applied on the surface of the substrate SUB (FIG. 4A).

Figure 4C:
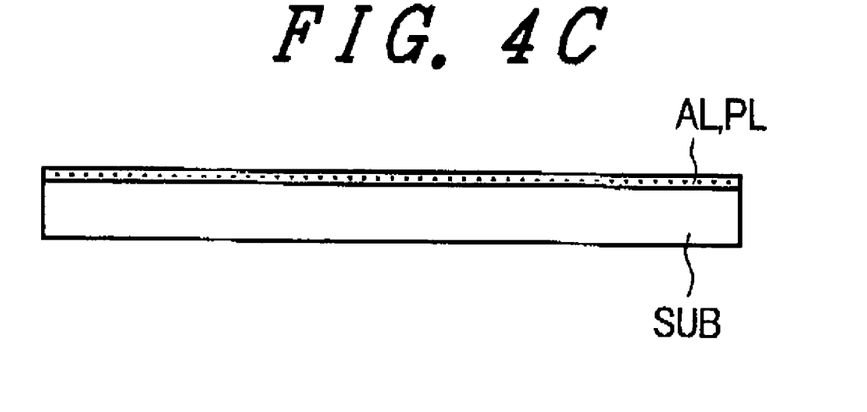

The resultant substrate SUB is inclined and an entire surface thereof is allowed to be wet with the solution (FIG. 4B) and, then, a film of the substance, namely, the high boiling point organic material layer PL simultaneously serving as the orientation film is applied on the surface of the substrate SUB (FIG. 4C).

On this occasion, the function of the high boiling point organic material layer PL according to the invention is imparted to the orientation film AL itself; however, it goes without saying that these layer and film can individually separately be formed.

FIG. 5 is a diagram showing still another embodiment of a method for forming the high boiling point organic material layer PL.

Figure 5A:
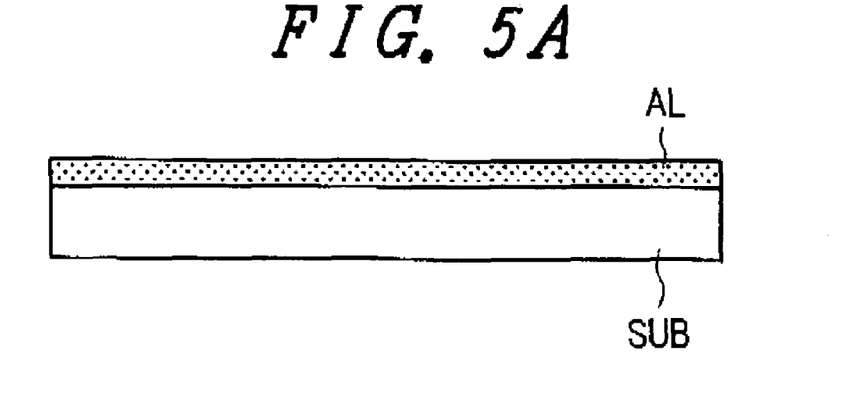
FIG. 5 is an explanatory diagram showing still another embodiment of a method for attaching any one of the saturated hydrocarbons on the substrate.

At least one substance among examples of the substances described above is mixed to the orientation film AL and, then, the resultant orientation film AL is applied on the surface of the substrate SUB (FIG. 5A).

Figure 5B:
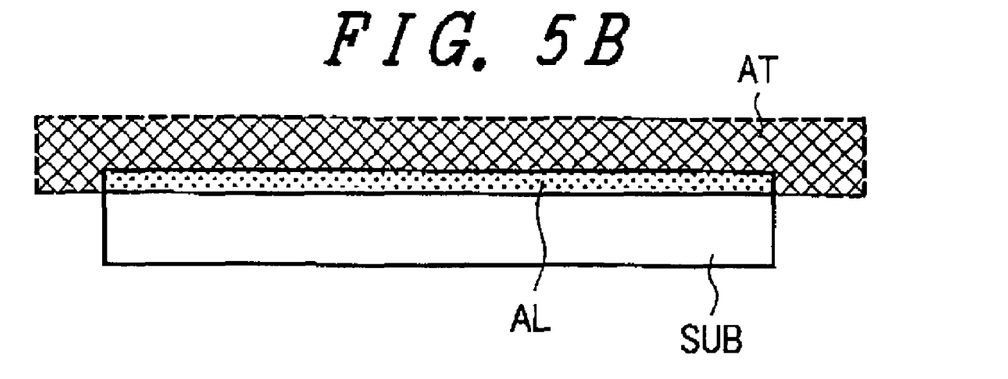

The orientation film AL is subjected to sintering. On this occasion, the above-described material is vaporized in the vicinity of the orientation film AL by a heating temperature, to thereby generate an atmosphere containing such vapor of the substance (FIG. 5B).

Figure 5C:
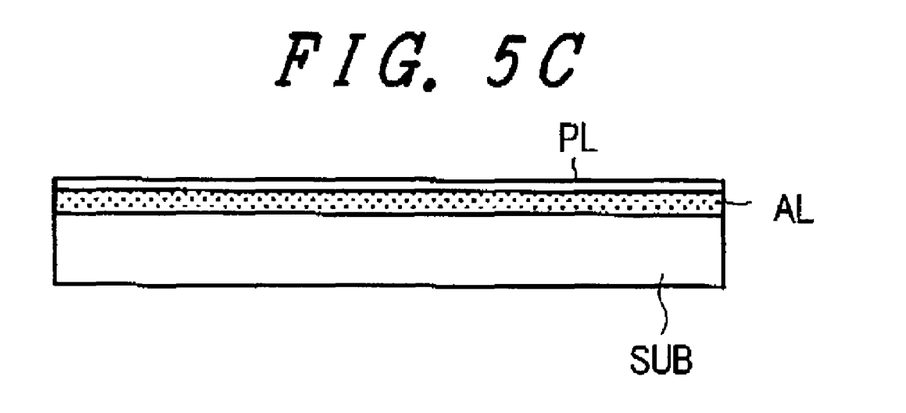

Along with the sintering, the substance is formed on the orientation film AL as the high boiling point organic material layer PL (FIG. 5C).

Then, the liquid crystal display device realized above effect is decomposed and, after a substance of the high boiling point organic material layer PL is collected, it can be confirmed whether the substance can be detected by a so-called GC/MS method.

Such confirmation procedures are described below.

Figure 6A:
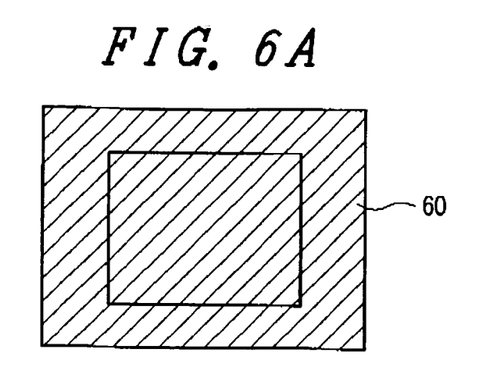
FIG. 6 is an explanatory diagram showing a first step of a series of steps for confirming whether, after the liquid crystal display device is decomposed and, then, a material of a high boiling point organic compound is collected, the material can be detected or not by using a GC/MS method.
Figure 6B:
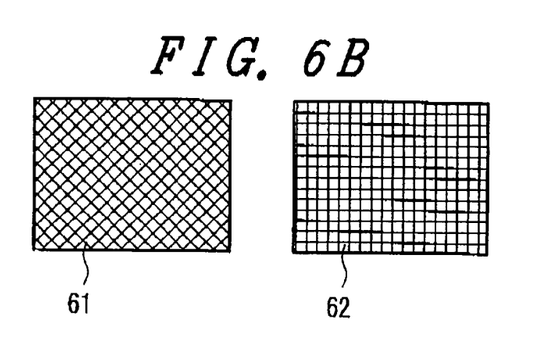
Figure 7:
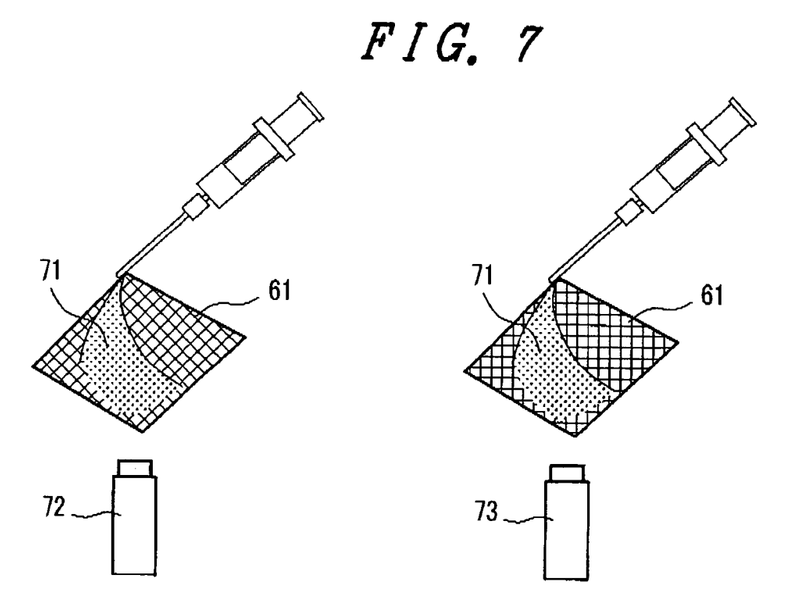
FIG. 7 is an explanatory diagram showing a second step of a series of steps for confirming whether, after the liquid crystal display device is decomposed and, then, a material of a high boiling point organic compound is collected, the material can be detected or not by using a GC/MS method.
Figure 8:
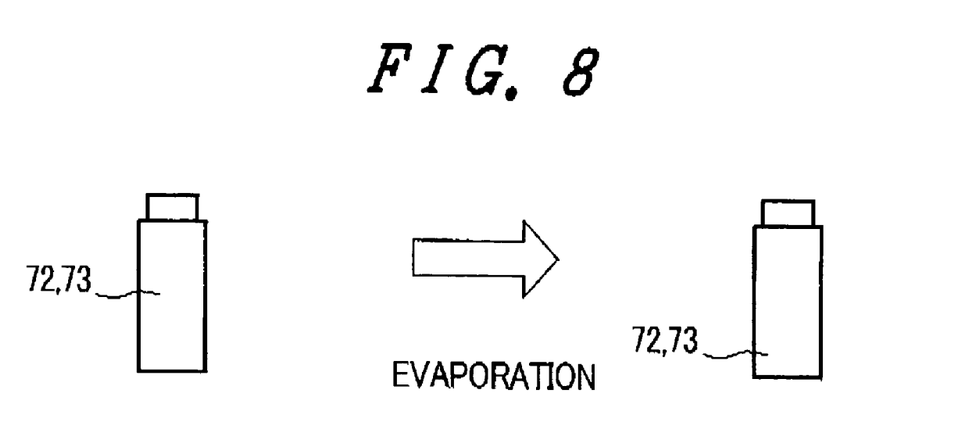
FIG. 8 is an explanatory diagram showing a third step of a series of steps for confirming whether, after the liquid crystal display device is decomposed and, then, a material of a high boiling point organic compound is collected, the material can be detected or not by using a GC/MS method.

Firstly, with reference to FIGS. 6 to 8, the liquid crystal and a method for collecting impurities are described.

A TFT face 61 of a TFT substrate and a color filter face 62 of a color filter substrate are taken out from a liquid crystal panel 60 as shown in FIG. 6A. Next, as shown in FIG. 7, the thus-taken-out TFT face 61 (face in contact with liquid crystal) of the TFT substrate and color filter face 62 (face in contact with liquid crystal) of the color filter substrate were rinsed with a solvent 71, to collect solvents in containers 72, 73, respectively. Then, as shown in FIG. 8, solvents in containers 72, 73 are evaporated at room temperature, to thereby collect liquid crystal and impurities.

In these ways, the liquid crystal used in the liquid crystal display panel and impurities can be collected. Further, an amount in which the liquid crystal is actually present can be calculated in the procedure described below.

For example, in a case in which display face of the liquid crystal panel in which a cell gap is 4 μm is cut out in a sizes of 10 cm×10 cm;

Since 4 μm=0.0004 cm=$4.0\times10^{-4}$ cm, $4\times10^{-4}$ cm× 10 cm×10 cm=$4.0\times10^{-2}$ cm$^3$=$4.0\times10^{-2}$ ml of liquid crystal is present.

Namely, $4.0\times10^{-2}$ ml=$4.0\times10^{-2}\times10^3$ μl=40 μl of liquid crystal is present.

Next, an amount of impurities adsorbed on a unit area of the substrate surface is calculated.

Figure 9:
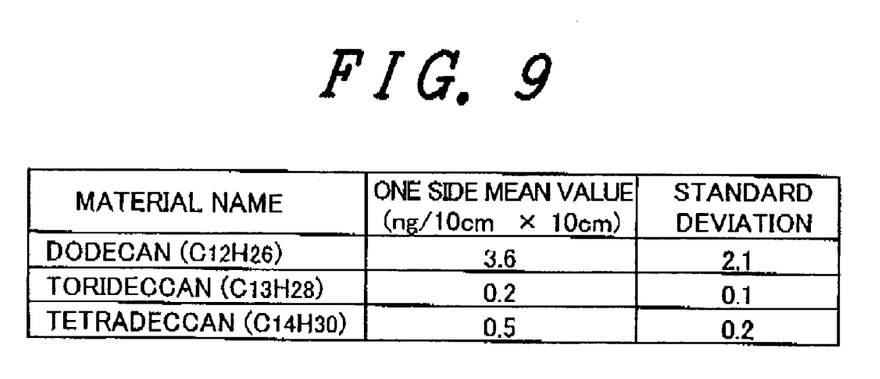
FIG. 9 shows quantities of materials adsorbed on a substrate surface to be obtained by works shown in FIGS. 6 to 8.

FIG. 9 shows quantities of materials adsorbed on a substrate surface.

From FIG. 9, against dodecane ($C_{12}H_{26}$) which is largest in quantity, when an average value thereof+standard deviation×3 (99.73% of all data is included) is calculated,

[3.6+(2.1×3)×2=19.8 ng/100 cm$^2$≈0.2 ng/cm$^2$.

It was found that 0.2 ng/cm$^2$ of impurities were adsorbed per unit area.

Therefore, from these test results, when impurities according to the invention having at least the above-described amount are contained, the effect according to the invention is realized.

The above-described embodiments may be conducted each individually or in combinations. This is because effects of respective embodiments can be realized each individually or synergistically.

What is claimed is:

1. A liquid crystal display device, comprising:
   a pair of substrates; and
   liquid crystal interposed between said pair of substrates,
   wherein a film comprising a hydrocarbon represented by the formula $C_nH_{2n+2}$ is formed on a face, which comes in contact with said liquid crystal, of each substrates of said pair of substrates, and
   wherein said film comprises the hydrocarbon represented by the formula $C_nH_{2n+2}$ in an amount of 0.2 ng/cm$^2$ or more, and n is a value from 5 to 30.

2. The liquid crystal display device according to claim 1, wherein each substrate of said pair of substrates has an orientation film at the side at which said liquid crystal is arranged; and
   said film comprising the hydrocarbon represented by the formula $C_nH_{2n+2}$ is formed on an upper face of said orientation film.

3. The liquid crystal display device according to claim 1, wherein said film comprising the hydrocarbon represented by the formula $C_nH_{2n+2}$ is an orientation film arranged at the side, at which said liquid crystal is arranged, of each substrate of said pair of substrates.

4. A liquid crystal display device, comprising:
   a pair of substrates; and
   liquid crystal interposed between said pair of substrates,
   wherein a film comprising a hydrocarbon represented by the formula $C_nH_{2n+2}$ is formed on a face, which comes in contact with said liquid crystal, of each substrates of said pair of substrates, and
   wherein said film comprises the hydrocarbon represented by the formula $C_nH_{2n+2}$ in an amount of 0.2 ng/cm$^2$ or more, and n is a value from 10 to 30.

5. The liquid crystal display device according to claim 4,
wherein each substrate of said pair of substrates has an orientation film at the side at which said liquid crystal is arranged; and
said film comprising the hydrocarbon represented by the formula $C_nH_{2n+2}$ is formed on an upper face of said orientation film.

6. The liquid crystal display device according to claim 4,
wherein said film comprising the hydrocarbon represented by the formula $C_nH_{2n+2}$ is an orientation film arranged at the side, at which said liquid crystal is arranged, of each substrate of said pair of substrates.

7. A liquid crystal display device, comprising:
a pair of substrates; and
liquid crystal interposed between the pair of substrates,
wherein a film comprising a hydrocarbon represented by the formula $C_nH_{2n+2}$ is formed on a face, which comes in contact with said liquid crystal, of each substrates of said pair of substrates, and
wherein said film comprises the hydrocarbon represented by the formula $C_nH_{2n+2}$ in an amount of 0.2 ng/cm$^2$ or more and n is a value of 25.

8. The liquid crystal display device according to claim 7,
wherein each substrate of said pair of substrates has an orientation film at the side at which said liquid crystal is arranged; and
said film comprising the hydrocarbon represented by the formula $C_nH_{2n+2}$ is formed on an upper face of said orientation film.

9. The liquid crystal display device according to claim 7,
wherein said film comprising the hydrocarbon represented by the formula $C_nH_{2n+2}$ is an orientation film arranged at the side, at which said liquid crystal is arranged, of each substrate of said pair of substrates.

* * * * *